United States Patent [19]

Kittelson et al.

[11] Patent Number: 5,168,853
[45] Date of Patent: Dec. 8, 1992

[54] SYSTEM FOR OPTIMIZING THE PERFORMANCE OF INTERNAL COMBUSTION ENGINES

[75] Inventors: David B. Kittelson; Michael J. Pipho, both of Minneapolis; Matthew L. Franklin, Austin, all of Minn.

[73] Assignee: Optimizer Control Corp., Minneapolis, Minn.

[21] Appl. No.: 864,308

[22] Filed: Apr. 6, 1992

[51] Int. Cl.⁵ .............................................. F02P 5/06
[52] U.S. Cl. ..................................... 123/419; 123/414
[58] Field of Search .............. 123/419, 418, 414, 422, 123/423, 406, 416; 364/431.05

[56] References Cited

U.S. PATENT DOCUMENTS

| | | | |
|---|---|---|---|
| 4,026,251 | 5/1977 | Schweitzer et al. | 123/419 |
| 4,575,800 | 3/1986 | Kittelson | 364/431.05 |
| 4,586,473 | 5/1986 | Mguyen | 123/419 |
| 4,841,933 | 6/1989 | McHale et al. | 123/419 |
| 4,893,600 | 1/1990 | Holmes | 123/419 |
| 4,915,079 | 4/1990 | Holmes | 123/419 |
| 4,969,439 | 11/1990 | Scotson | 123/419 |
| 5,001,645 | 3/1991 | Williams et al. | 364/431.08 |

Primary Examiner—Raymond A. Nelli
Attorney, Agent, or Firm—Haugen and Nikolai

[57] ABSTRACT

An engine performance optimizing system is described that requires only a single engine parameter (shaft revolution time) to be measured. By simultaneously dithering spark timing, air/fuel ratio and/or EGR rate in accordance with a predetermined cyclic pattern, and measuring shaft speed during each discrete phase of the dither cycle, correction factors can be computed and used to adjust the spark setting, the air flow and/or the recirculation rate in a way that causes engine performance to be enhanced in terms of fuel economy and lowered emissions.

14 Claims, 4 Drawing Sheets

SYSTEM FOR OPTIMIZING THE PERFORMANCE OF INTERNAL COMBUSTION ENGINES

BACKGROUND OF THE INVENTION

I. Field of the Invention

This invention relates generally to an adaptive control system for improving the performance of an internal combustion engine, and more specifically to a closed-loop control system in which both spark timing and air/fuel ratio or exhaust gas recirculation are simultaneously adjusted to achieve the enhanced performance.

II. Discussion of the Prior Art

In the Schweitzer et al. U.S. Pat. No. 4,026,251, a closed-loop digital electronic control system for an internal combustion engine is described. In that system, a machine-controlling parameter is perturbated (dithered) about a given setting and the performance of the machine is monitored to determine whether movement of the machine controlling parameter about the given setting results in an improved or degraded performance. When a given movement of the machine control parameter setting results in improved performance, the resulting control signal developed by the electronic system is used to create a further movement of the control setting in the same direction. However, if the small change introduced results in degraded performance, then the machine setting is moved in the opposite direction.

An improved version of the system of the Schweitzer et al. patent is described in U.S. Pat. No. 4,575,800 to David B. Kittelson. Instead of relying upon a fixed dither frequency, a variable frequency dither cycle synchronized with the engine's normal operating cycle is selected. By providing a shaft rotation sensor, each dither cycle begins with respect to a predetermined shaft angle and each phase of the dither cycle (advance and retard) is comprised of an equal number of firing pulses. Using this approach, the engine's cylinder firings do not continuously move in and out of phase with respect to the dithering of the machine control parameter which serves to reduce the error signal, especially as compared to the system of the aforereferenced Schweitzer et al patent.

In the Kittelson system, the ignition timing is automatically adjusted to provide minimum fuel consumption for a range of operating conditions, fuels, and air/fuel ratios. It works by advancing and retarding the spark timing (dithering) and monitoring the engine response to the timing changes. If the system determines that the engine speeds up during the advance phase of the dither, a small advance correction is applied to the base timing. If the engine slows down during the advanced phase of the cycle, a retard correction is made. These corrections continue until no speed changes are detected.

Those skilled in the art appreciate that internal combustion engines require air/fuel ratio, ignition timing and (in some cases) exhaust gas recirculation rate (EGR) be adjusted properly to achieve optimum (minimum) fuel consumption. Where the operating conditions of the engine are well defined and the fuel properties do not change, it is possible to derive "maps" of the optimum ignition timing and air/fuel ratio or EGR for a given engine. However, if operating conditions change outside of the range of the maps or ambient conditions change and are not corrected for, or if engine-to-engine variations exist due to manufacturing tolerances, wear, deposit accumulations or if the fuel properties change, mapped systems will not be able to keep the spark timing or air/fuel ratio at optimum. The Holmes U.S. Pat. No. 4,893,600 assigned to Lucas Industries plc describes an optimization scheme based upon the dithering principle, and which requires that an engine performance map relating to varying conditions be stored in a memory and utilized during the control sequence.

The air/fuel ratio presents even a greater challenge. Although the optimum air/fuel ratio can be found for a range of operating conditions, there are currently no simple feedback sensors to determine if the proper air/fuel ratio is being maintained. Moreover, changes in fuel properties and ambient conditions can substantially change the required air/fuel ratio. For these reasons, mapped systems simply cannot adjust for such changes.

As is described in the Schweitzer et al. U.S. Pat. No. 4,026,251, an adaptive control system for optimizing internal combustion engines of the type used in adjusting spark timing may also be used to control the air/fuel ratio. Thus, if the air flow to the engine is dithered while the fuel flow is held constant, and corrections applied in a fashion similar to the timing adjustment described above, the air/fuel ratio for minimum fuel consumption can be determined. If the fuel is dithered with constant air flow, then the maximum power air/fuel ratio can be reached. If the base air or fuel flows are changing due to non-steady engine operation, the optimum air/fuel ratio can still be determined by comparison of the rates of change in engine speed during the different phases of the dither cycle. If it is found that the engine speeds up more during the lean portion of the cycle than during the rich portion, correction in the lean direction is made. On the other hand, if the engine slows down during the lean portion of the dither cycle, correction is made in the rich direction. The implementation of a system for optimizing air/fuel ratio requires a method for dithering the engine air flow while maintaining constant fuel flow.

An adaptive, optimizing system for both air/fuel ratio and ignition timing is found to be particularly useful in applications in which the fuel properties are variable. Fuel properties are difficult for engine control systems to measure and can have large effects on the optimum air/fuel ratio and timing. Where the control system is unable to measure fuel properties, such as in so-called flexible fuel systems, a mapped system, such as described in the aforereferenced Holmes '600 patent, is of little use in determining the proper air/fuel ratio or timing. Applications where fuel properties are variable include natural gas fueled engines and engines fueled by waste gas, such as oil refinery byproducts, or bio-gas from landfills. In these cases, the fuel is made up of a variety of components with the concentrations of these components varying unpredictably.

Those skilled in the art appreciate that the exhaust gas recirculation rate is employed chiefly to achieve $NO_x$ control. However, the optimum EGR rate can also result in improved fuel economy. For engines designed for stoichiometric operation, the air/fuel ratio is held constant using an oxygen sensor and feedback control. In such a system, simultaneous optimization of timing and EGR can be advantageous. In fact, depending upon the design of other parts of the control system, optimization of timing, A/F ratio and EGR rate in various combinations proves attractive.

SUMMARY OF THE INVENTION

In accordance with one aspect of the present invention, an improvement over the system described in the Kittelson Pat. No. 4,575,800 results in that it combines both timing and air/fuel optimization. Another embodiment involves simultaneous adjustment of spark timing and exhaust gas recirculation (EGR). In carrying out the first approach, the air/fuel ratio and spark timing are dithered simultaneously and a correction in the direction of maximum efficiency gain is made. For example, a possible dither cycle might involve two revolutions of the engine shaft with the spark timing advanced and the air/fuel ratio lean followed by two revolutions of the engine shaft with the spark timing retarded and the air/fuel ratio lean, then two revolutions with the spark timing advanced at the air/fuel ratio rich and finally two revolutions of the shaft with the spark timing retarded and the air/fuel ratio rich.

Means are provided for sensing changes in the shaft revolution time during predetermined portions of the dither cycle and for creating both a spark timing error signal and an air/fuel ratio error signal. Corrections to the spark advance setting and the air/fuel ratio can then be made based on the magnitude and the algebraic sign of these two computed error signals. A similar protocol may be used where EGR rate is the dithered parameter.

The adaptive control strategy in which air/fuel ratio and/or exhaust gas recirculation rate are simultaneously optimized along with ignition timing adjusts to the needs of the engine as operating conditions and fuel properties change and as the engine wears. This is particularly attractive for natural gas fueled engines because of large variations in the composition of the gas commonly encountered. Composition variations change both the timing and air/fuel ratio requirements. The control strategy of the present invention uses the engine itself to sense the optimum timing and air/fuel ratio and/or exhaust gas recirculation rate. Small synchronous speed perturbations produced by introducing disturbances into the air/fuel ratio, the exhaust gas recirculation rate and/or the ignition timing are appropriately accumulated in relation to the disturbance pattern employed and are used to develop error signals which, when fed back to appropriate transducers, adjust the engine control parameters in a direction to minimize error.

The correction to the dithered parameter could be a fixed constant depending only on the sign of the error signal. It may also be directly proportional to the error signal, or the error signal squared or some other mathematical conversion. Thresholds for "dead-band" can be set as well as limits for maximum correction amplitude.

No matter how the correction is calculated, the error signal from a single atypical dither cycle could cause the correction to be in the wrong direction. If the gain between the error signal and the correction is high for fast response, the dithered parameter could jump about wildly. If the gain is small, the errant corrections will be minimized, but then the response is slowed. A solution to this dilemma would be to base the magnitude of the correction on the result of a statistical analysis over several dither cycles. The correction could then be based on the mean error signal, but also could be moderated by a statistical estimate of the cyclic spread or uncertainty. If the cyclic variation is high, e.g., the standard deviation is of the same order or larger than the mean, then the correction would be small, thus preventing wild changes when cyclic variation is high. On the other hand, if the standard deviation is small compared to the mean, then the correction can be larger, since the confidence in the mean is high, thus speeding up response when cyclic variation is low.

This approach allows automatic adjustment of air/fuel ratio at or in a fixed relationship to the maximum fuel economy setting at the condition which produces the best combination of low $NO_x$ and hydrocarbon emissions. At the same time, the ignition timing control strategy adjusts to set the timing to or in a fixed relationship to maximum brake torque (MBT) for maximum fuel economy and torque. By introducing programmed "bias" components, the operating point for each variable may be set in a fixed relationship to the torque maximum with respect to that variable. This strategy also has the advantage of obviating the need for multiple sensors. Only a single engine shaft rotation sensor is needed.

The control algorithm is programmed into a microprocessor which accepts as inputs, the engine revolution signals and which converts them into revolution times. The microprocessor also controls the dithering cycle, allowing the revolution times attributable to individual segments of the cycle to be summed in developing the ultimate error signals used to shift the control parameter in a direction to improve engine performance. "Biasing" can be incorporated into the algorithm to, for example, maintain the timing retarded (or advanced) of the MBT setting where necessary to control emissions, knock or rate of pressure rise. In those applications which call for rapid response to transient changes, the system of the present invention may be used in conjunction with an open-loop map which sets approximate timing and air fuel ratios for a given speed and load condition. The open-loop map thus provides for rapid control in response to transient changes in the engine control parameter while the adaptive system can fine-tune the timing.

In accordance with this invention, the adaptive part of the system utilizes the engine itself as a sensor to correct for fuel quality, engine variability and wear, ambient conditions as well as other variables which may not be easily measured.

Because the optimum values of control variables are interdependent, it is desirable to be able to control them essentially simultaneously. The control strategy employed varies both air/fuel ratio (or EGR) and timing during each dither cycle and determining the appropriate corrections for each of these parameters. This results in a fast response system since timing and air/fuel ratio or EGR will follow the best path to their respective optimum values. In effect, then, the system takes the shortest path to the summit of the efficiency surface in efficiency, timing and air/fuel ratio space.

Open-loop maps for both timing and air/fuel ratio are incorporated into the control system. The values in these maps are continuously updated using learning algorithms to apply the information obtained by the optimizing system. This allows fast and accurate transient response while retaining the advantages of adaptive control. It has been found that for stationary engine applications with relatively slow transients, the adaptive timing control system described in the Kittelson patent without open-loop control provides satisfactory performance. However, for vehicular applications or stationary applications exhibiting fast transient requirements, the open-loop system added to the adaptive control serves to maintain optimum air/fuel and timing conditions during rapid transients.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which.

DESCRIPTION OF THE PREFERRED EMBODIMENT

Figure 1:
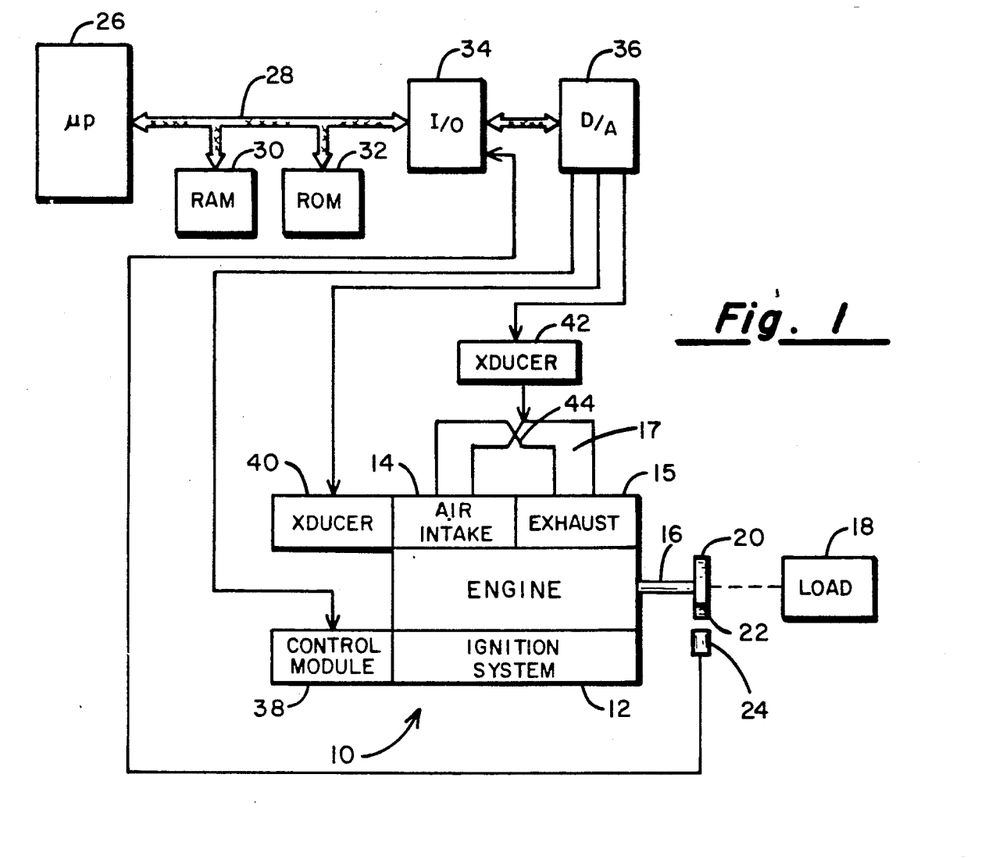
FIG. 1 is a block diagram representation of the preferred embodiment of a system for optimizing the performance of internal combustion engines in which both spark timing and air/fuel ratio are simultaneously dithered.

Referring to the block diagram of FIG. 1, there is indicated generally by numeral 10 an internal combustion engine having a ignition system 12 of the type having means for adjusting the angle of advance/retard of the ignition spark relative to the piston's top dead center position. The engine 10 may also be provided with an air intake 14, and an exhaust manifold 15, each of which is equipped with a transducer and valve of the type shown in the aforereferenced Schweitzer et al. U.S. Pat. No. 4,026,251. This provides a means whereby the air/fuel ratio and EGR flow in tube 17 may be changed, assuming that fuel flow remains constant.

The engine 10 also has an output shaft 16 which is coupled through a transmission (not shown) to the load 18. Secured to the shaft is a disk 20 having a detectable mark 22 formed thereon. As the mark 22 rotates past a pickup device 24, a signal is generated indicating one full revolution of the engine shaft 16. It should be obvious that the mark may also be integral to the engine's flywheel or crankshaft.

The control system of the present invention is implemented by means of a microprocessor 26 of conventional design and having a system bus 28 coupled to a RAM 30 and a ROM 32. Also coupled to the system bus 28 is an I/O module 34 which functions as an interface between the microprocessor 26 and the revolution detecting pickup 24 as well as a digital-to-analog converter 36. The output from the digital-to-analog converter is applied to the electronic control module 38 associated with the ignition system, with the transducer 40 used to adjust the air flow to the engine, via the air intake 14 and with the transducer 42 associated with the exhaust gas recirculation valve 44 in the tube 17.

Figure 6:
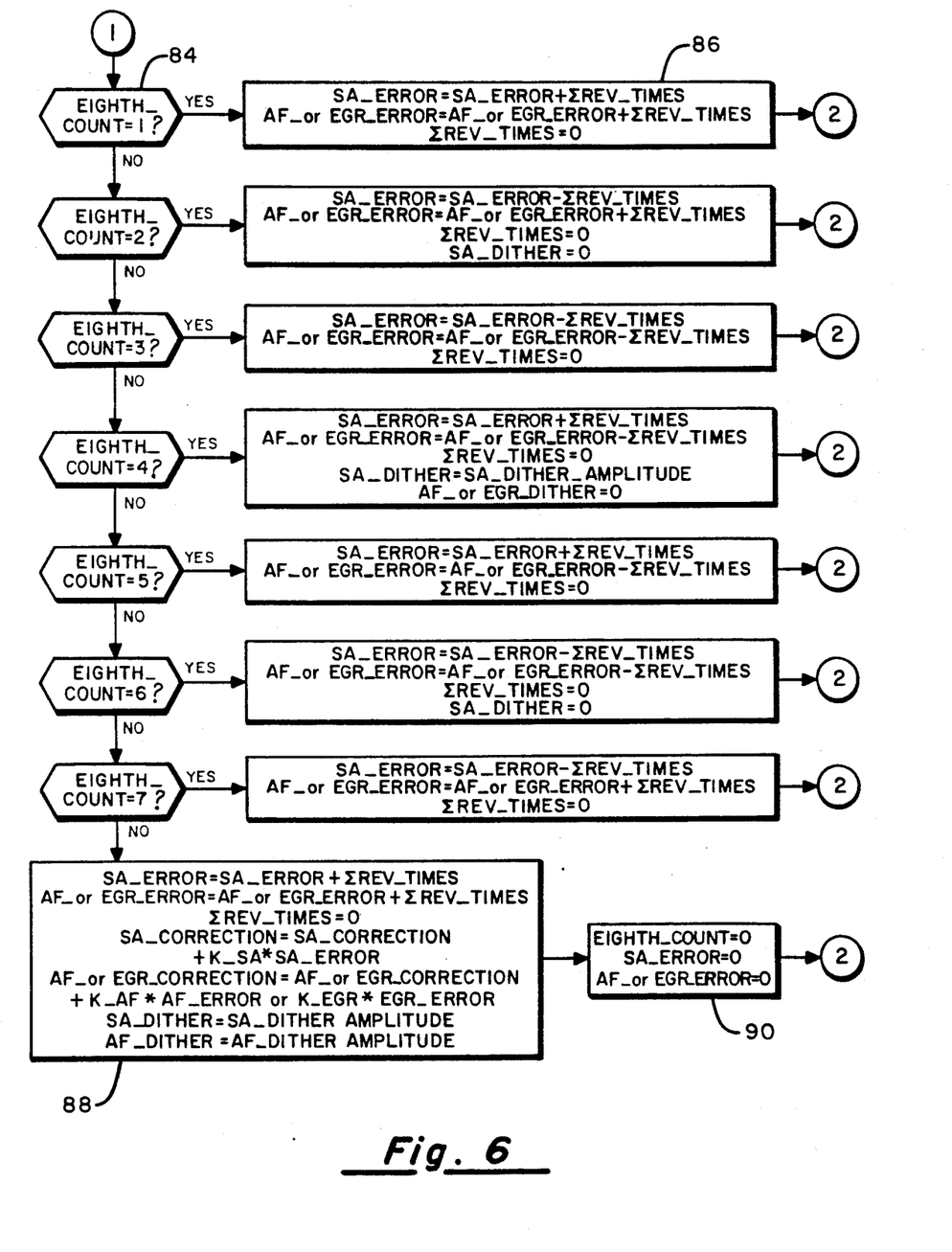
FIG. 6 is a software flow diagram of the main subroutine executed by the microprocessor in deriving the error signals used to adjust air/fuel ratio or EGR rate and spark timing.
Figure 7:
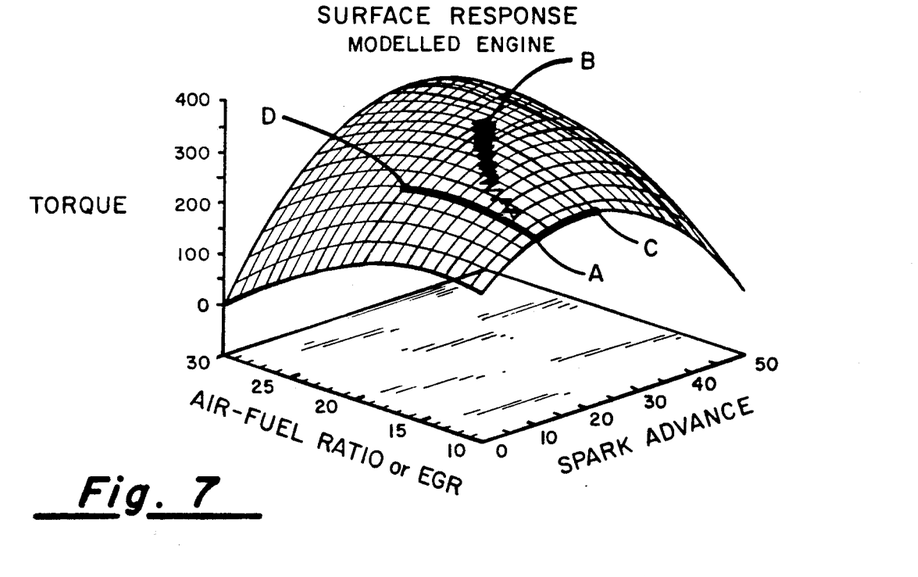
FIG. 7 is a graphical representation illustrating the manner in which engine performance approaches optimum when air/fuel ratio and spark timing are simultaneously dithered.

Stored in the ROM 32 is a program of instructions for the microprocessor 26 which causes the microprocessor 26 to execute the instructions previously programmed to implement the algorithm reflected in the software flow diagram of FIGS. 6 and 7.

The RAM memory 30 is used as a scratchpad used in carrying out the error signal computations and for temporarily storing computational results during various stages of program execution. The microprocessor 26 along with its associated memories, system bus, I/O module and D/A converter are entirely conventional. With no limitation intended, the microprocessor hardware may comprise an Intel 80486 microprocessor chip and associated memory and I/O logic.

Figure 2:
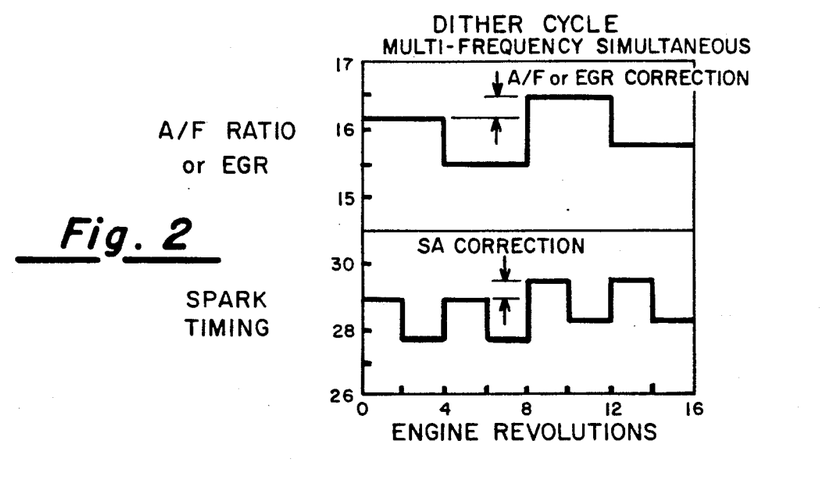
FIG. 2 is a waveform illustrating the format of two complete dither cycles in accordance with the invention.

As indicated in the introductory portion of this specification, the control system of the present invention is of the "dithering" type in which two engine controlling parameters (air/fuel ratio and spark timing) or EGR and spark timing are simultaneously perturbated in accordance with a predetermined dither cycle while the performance of the machine is continuously sensed to determine whether the dithering in a given direction improves or degrades engine performance. If engine performance improvement is detected, the machine control parameter setting is adjusted in the appropriate direction and this process is continuously repeated, causing the engine's operating point to locate itself at an optimal position for that particular engine. FIG. 2 illustrates a typical dither cycle in accordance with the present invention. Here, spark timing and A/F ratio are shown on a graph where the abscissa is engine revolutions. Considering this graph, it can be seen that for the first two revolutions of the engine shaft, spark timing is advanced and A/F is lean. During the next two revolutions, spark timing is retarded while the A/F ratio remains lean. During the succeeding two revolutions, the spark is again advanced while the A/F is rich and during the last two revolutions, spark is again retarded and the A/F is rich. The graph of FIG. 2 also shows that at the conclusion of the dither cycle, an appropriate correction is made to both the spark timing setting and air/fuel ratio setting and then the dither cycle repeats during the succeeding eight revolutions.

It is to be understood that the dither cycle illustrated by the graph of FIG. 2 is only one way in which air/fuel ratio and spark timing can be simultaneously shifted by incremental amounts so that engine performance can be assessed during the various individual phases of the dither cycle and an appropriate error signal generated for providing the correction.

Figure 3:
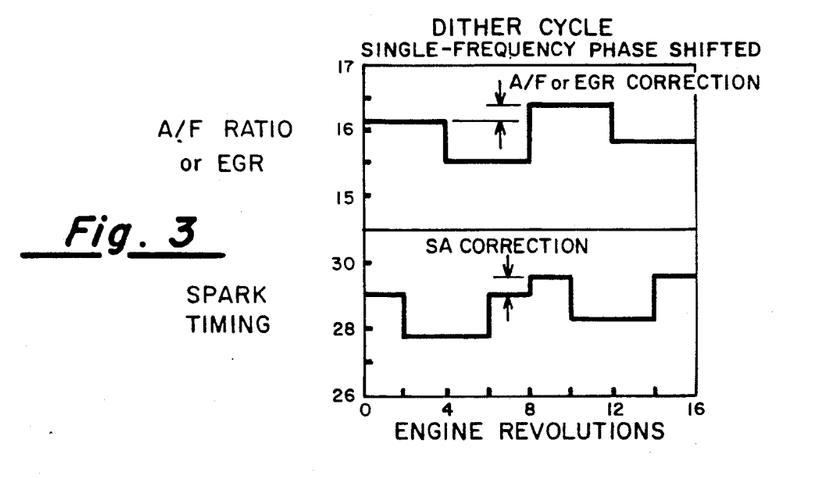
FIG. 3 is a waveform showing an alternative dither cycle sequence used in practicing the invention.

FIG. 3 is a graph of a different dither cycle, also operable to achieve the desired adjustment in engine performance to accommodate changes in ambient conditions. In the graph of FIG. 3, during the first two revolutions, spark timing is advanced and air/fuel is lean. During the third and fourth revolutions of the engine shaft, spark timing is retarded while A/F remains lean. During the fifth and sixth revolutions, spark timing remains retarded and A/F is made rich, and during the seventh and eighth revolutions, spark timing is advanced while A/F remains rich. Again, the appropriate correction in the engine control parameter setting is made at the conclusion of the dither cycle and the sequence then repeats.

Figure 4:
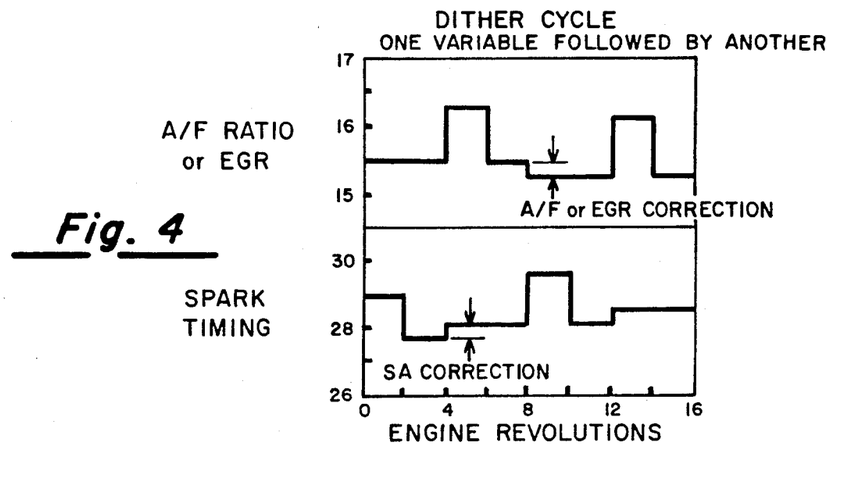
FIG. 4 shows yet another alternative dither cycle sequence used in practicing the invention.

The dither cycle represented by the graph of FIG. 4 is illustrative of yet another way of dithering the two machine control parameters, spark timing and A/F ratio. Here, during the first four engine revolutions, spark timing is dithered while the A/F ratio remains fixed, and during the ensuing four engine revolutions, spark timing remains fixed while the air/fuel ratio is dithered. This is carried out on an alternating basis and correction to a given one of the machine control settings is effected at the conclusion of that particular quantity's dither sequence.

With the dither cycle represented by FIG. 2, the amount of correction to be made is computed in accordance with the following equations:

$$\text{S.A. ERROR} = T_1 - T_2 - T_3 + T_4 + T_5 - T_6 - T_7 + T_8$$

$$\text{A/F ERROR} = T_1 + T_2 - T_3 - T_4 - T_5 - T_6 + T_7 + T_8$$

were $T_i$ is the revolution time measured for the $i_{th}$ revolution of the dither cycle. Corrections to the spark advance and air/fuel ratio can then be made based on the magnitude and algebraic sign of the computed error values. Using a dither cycle like that shown in FIG. 3, the corresponding error equations are as follows:

$$\text{S.A. ERROR} = -T_1 - T_2 - T_3 - T_4 + T_5 + T_6 + T_7 + T_8$$

$$\text{A/F ERROR} = T_1 + T_2 - T_3 - T_4 - T_5 - T_6 + T_7 + T_8$$

When the dither cycle of FIG. 4 is employed, the corresponding error equations for spark advance and air/fuel ratio are as follows:

$$\text{S.A. ERROR} = T_1 - T_2 - T_3 + T_4$$

$$\text{A/F ERROR} = T_5 - T_6 - T_7 + T_8$$

Figure 5:
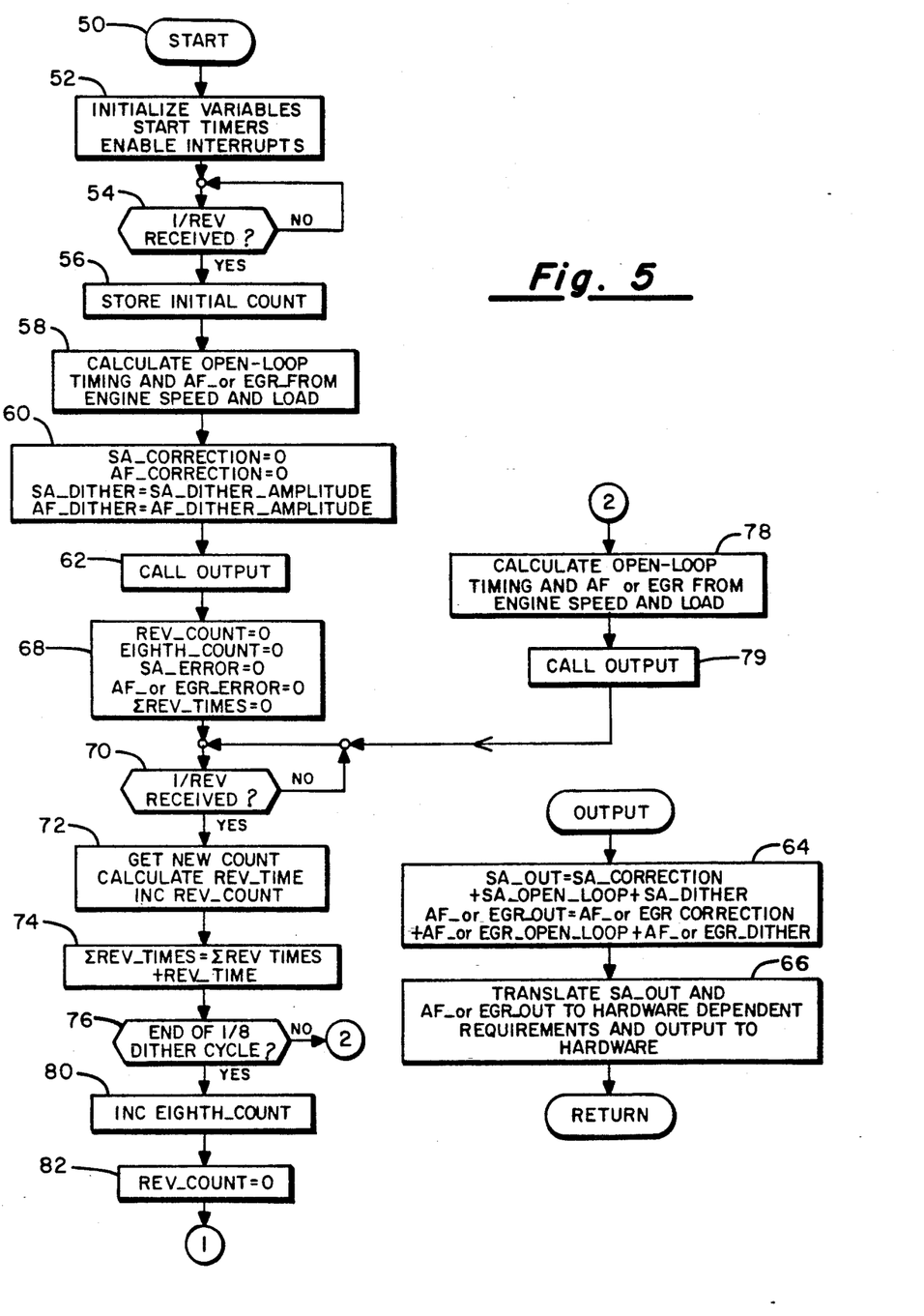
FIG. 5 is a software flow diagram of the main routine executed by the microprocessor in the system of FIG. 1 and of the subroutine to output data to the actuators which change timing and A/F or EGR rate.

The flow charts of FIGS. 5 and 6 are based upon the dither cycle of FIG. 2. One skilled in the art, seeing how the software algorithm ties in with the dither cycle shown in FIG. 2, would be in a position to write the program for computing the spark advance error and the air/fuel error based upon the other optional dither cycle patterns of FIGS. 3 and 4. FIG. 5 illustrates a software flow diagram of the main routine. At engine start-up, the program is entered at block 50 and the first step is to initialize certain variables, initiate the running of certain timers and enable interrupts so that the once-per-revolution pulses from the pickup 24 can be appropriately referenced in time to define a starting point for the dither cycle employed. These operations are represented by blocks 52, 54 and 56.

Next, once the initial count is stored, representing the time interval between start-up and the occurrence of the first revolution pulse from pickup 24, it is possible to use this count value in ensuing computations of revolution times.

Block 58 contemplates that there is stored in a battery backed-up RAM 30 a table that will provide an initial spark timing value and air/fuel ratio and/or EGR rate based upon existing engine speed and load. By using such a RAM, the system can update variables to effectively "learn". It is also necessary to establish an initial spark advance (SA) correction and A/F ratio or EGR rate correction for the start of the first dither period. As shown by block 60, at the outset, the S.A. Correction and the A/F Correction (or EGR) are set to 0. The S.A. Dither and A/F Dither (or EGR) are set to the corresponding dither amplitudes which have been previously stored in ROM 32 (or battery backed-up RAM 30). The original corrections could also be set to some value other than 0 to reflect previous operation of the system. The control system of the present invention will then operate to fine-tune the SA correction and A/F or EGR correction values during sequential iterative cycles of operation.

Once those initialization steps have been accomplished, the OUTPUT subroutine is called (block 62). This OUTPUT subroutine includes the operations indicated in blocks 64 and 66 in FIG. 5. It essentially takes the values which had been stored as the open-loop values and adds the corrections and the dithers to those (block 60) and converts them to values which the system hardware requires for the engine involved.

Following execution of the OUTPUT subroutine, flow returns to block 68, which reflects that the revolution count is set to zero as is the eighth count index, the SA error and A/F or EGR error, and finally the sum of the revolution times is also set to zero. This completes the initialization of the program.

Once all of the initialization steps have been carried out, a test is made at block 70 to determine whether a once-per-revolution indication has been received from the pickup 24. When that test is satisfied and a one-per-revolution pulse has occurred, the microprocessor calculates what the new count was during that time interval and from that, the revolution time from the new count and the old count can be determined. That revolution time is then stored temporarily. Once stored, the revolution count is incremented so that the system will know that that phase has been completed. These operations are represented by block 72 in FIG. 5.

Next, block 74 indicates the steps required to sum the several revolution times that may comprises one-eighth of the overall dither cycle. In this way, it is possible to adjust the length of the dither cycle, depending upon existing engine speed. Because there may be more than one revolution in each eighth of a dither cycle, it is necessary to keep track of the total of the revolution times. A test is made at block 76 to determine whether one-eighth of a dither cycle has expired. If not, control passes to block 78 which shows that a calculation of a new open-loop timing value, based on the current engine speed and load is carried out. Then, the OUTPUT subroutine (blocks 64 and 66) are executed and program re-entry is made at the point where a test is made to determine whether the once-per-revolution pulse has occurred (block 70). It can be seen, then, that segment of the loop is repeated only if each eighth of a dither cycle requires more than one revolution. If, on the other hand, the end-of-eighth test 76 had been satisfied, the eighth count is incremented (block 80). Since a new eighth count interval is involved, the revolution count is set back to zero (block 82) and a determination is next made, via the software represented by the block diagram of FIG. 6, to determine which particular one-eighth dither cycle is now involved.

Referring to FIG. 6, if the system is operating in the first eighth of a cycle (block 84), a computation is made to begin accumulating the error for the cycle. The spark advance (SA) error which was set to zero in the first cycle earlier is added to the summation of the revolution times for the past one-eighth of the cycle and the A/F or EGR rate error is likewise calculated. Also, the sum of the revolution times must be set back to zero upon initiation of the second eighth count sequence so that a new count unique to the second eighth count can be generated. These operations are represented by block 86. Upon completion of those operations, control returns to block 78 in FIG. 5. This involves another execution of the OUTPUT subroutine and then waiting for the occurrence of the next one-per-revolution pulse.

It can be seen that operation repeatedly falls through the operations illustrated in FIG. 6 so that for each eighth of a cycle, error increments are accumulated with revolution times either being added or subtracted, all in accordance with the foregoing error equations (pages 12 and 13, supra).

After proceeding through all of the eighth counts of the dither cycle, the system next calculates what the correction to the spark advance and to the air/fuel ratio and/or the EGR rate should be, based upon the errors which had been calculated during the just-completed dither cycle. It can be seen from the equations shown in block 88 that there is added to the previous SA correction value, the SA dither amplitude plus a correction to that base which is proportional either to the spark advance error or the air/fuel ratio or EGR rate error.

Once that is completed, and as reflected by block 90, control sets the computed error signals as well as the eighth count index back to zero in anticipation of entering the first phase of the next dither cycle with control returning to block 78 in FIG. 5. These sequences are repeated over and over and as each correction to air/fuel ratio and/or EGR rate and spark advance occurs, the respective control parameter settings are incrementally adjusted so as to achieve optimum (minimum fuel consumption).

Referring to FIG. 7, there is a plot starting at point A and progressing to point B showing for a modelled engine the manner in which torque output improves as the control system of the present invention seeks, on an iterative basis, both optimum spark setting and optimum air/fuel ratio. Had only the spark timing been dithered, as in accordance with the aforereferenced Kittelson patent, the engine operating point would progress from point A to point C and operate at point C which is off optimum by a significant amount. Similarly, had only the air/fuel ratio been dithered, the engine operating point would move from point A to point D and tend to operate at point D, again, a point which is less than the maximum torque operating point (B) achieved when both air/fuel ratio and spark advance are dithered in accordance with the teachings of the present invention. Thus, by simultaneously dithering both engine control parameters and adjusting the setting thereof based upon computed error values, a more optimum engine performance is achieved. This is especially true in those applications in which the properties of the fuel involved vary.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For example, this system could be implemented on a stand alone basis, or incorporated as a part of a complete engine management system. Hence, the foregoing description should be construed as illustrative only and the following claims determine the scope of the protection afforded.

What is claimed is:

1. An adaptive electronic control system for optimizing fuel consumption of an internal combustion engine of the type having an output shaft coupled to a load to be driven, an ignition system with means for varying spark timing about a given spark timing setting during a dither cycle and means for varying the air/fuel ratio of the fuel mixture delivered to the engine about a given air/fuel ratio setting during said dither cycle, said control system comprising:

(a) shaft rotation sensing means coupled to said engine for sensing complete revolutions of said output shaft of said engine with respect to a fixed reference point;

(b) means coupled to said shaft rotation sensing means for symmetrically reciprocally moving the setting of both the spark timing and air/fuel ratio within said dither cycle back and forth about their respective given settings in synchronism with the angular rotation of said output shaft during successive integral engine cycles;

(c) speed determining means coupled to said shaft rotation sensing means for defining the average speed of rotation of said output shaft in plural segments of the period of symmetrical reciprocal movement of said spark timing setting and said air/fuel ratio setting about their respective settings;

(d) means responsive to said speed determining means for computing a spark advance error signal and an air/fuel ratio error signal;

(e) means for periodically adjusting said given settings of said spark timing in accordance with said spark advance error signal; and (f) means for periodically adjusting said given setting of air/fuel ratio in accordance with said air/fuel ratio error signal.

2. An adaptive electronic control system for optimizing fuel consumption of an internal combustion engine of the type having an output shaft coupled to a load to be driven, an ignition system with means for varying spark timing about a given spark timing setting during a dither cycle and means for varying the EGR flow of the fuel mixture delivered to the engine about a given EGR flow setting during said dither cycle, said control system comprising:

(a) shaft rotation sensing means coupled to said engine for sensing complete revolutions of said output shaft of said engine with respect to a fixed reference point;

(b) means coupled to said shaft rotation sensing means for symmetrically reciprocally moving the setting of both the spark timing and EGR flow within said dither cycle back and forth about their respective given settings in synchronism with the angular rotation of said output shaft during successive integral engine cycles;

(c) speed determining means coupled to said shaft rotation sensing means for defining the average speed of rotation of said output shaft in plural segments of the period of symmetrical reciprocal movement of said spark timing setting and said EGR flow setting about their respective settings;

(d) means responsive to said speed determining means for computing a spark advance error signal and an EGR flow error signal;

(e) means for periodically adjusting said given settings of said spark timing in accordance with said spark advance error signal; and (f) means for periodically adjusting said given setting of EGR flow in accordance with said EGR flow error signal.

3. The adaptive control system as in claim 1 wherein the period of symmetrical reciprocal movement of said air/fuel ratio setting is an integral multiple of the period of symmetrical reciprocal movement of said spark timing setting.

4. The adaptive control system as in claim 2 wherein the period of symmetrical reciprocal movement of said EGR flow setting is an integral multiple of the period of symmetrical reciprocal movement of said spark timing setting.

5. The adaptive electronic control system as in claim 3 wherein said means for computing comprises a programmed microprocessor.

6. The adaptive electronic control system as in claim 4 wherein said means for computing comprises a programmed microprocessor.

7. The adaptive electronic control system as in claim 5 wherein said programmed microprocessor computes the revolution time of said output shaft during predetermined phases of said period of reciprocal movement of said spark timing and air/fuel ratio settings.

8. The adaptive electronic control system as in claim 6 wherein said programmed microprocessor computes the revolution time of said output shaft during predetermined phases of said period of reciprocal movement of said spark timing and EGR flow settings.

9. The adaptive electronic control system as in claim 7 or 8 wherein said spark advance error signal is computed by said microprocessor means as the sum of the revolution times of said output shaft during the first quarter and last quarter of one cycle of said period of symmetrical reciprocal movement of said spark timing setting, less the sum of the revolution times of said output shaft during the second and third quarters of one cycle of said period of reciprocal movement of said spark timing setting.

10. The adaptive electronic control system as in claim 7 wherein said air/fuel ratio error signal is computed by said microprocessor means as the sum of the revolution times of said output shaft during the first and fourth quarters of one cycle of said period of symmetrical reciprocal movement of said air/fuel ratio setting less the sum of the revolution times of said output shafts during the second and third quarters of one cycle of said period of symmetrical reciprocal movement of said air/fuel ratio setting.

11. The adaptive electronic control system as in claim 8 wherein said EGR flow error signal is computed by said microprocessor means as the sum of the revolution times of said output shaft during the first and fourth quarters of one cycle of said period of symmetrical reciprocal movement of said EGR flow setting less the sum of the revolution times of said output shafts during the second and third quarters of said one cycle of period of symmetrical reciprocal movement of said EGR flow setting.

12. A method for minimizing the fuel consumption of an internal combustion engine of the type having an output shaft coupled to a load to be driven, an ignition system with means for varying spark timing about a given spark timing setting during a dither cycle and means for varying the air/fuel ratio of the fuel mixture delivered to the engine about a given air/fuel ratio setting during said dither cycle comprising the steps of:

(a) sensing integral rotations of said output shaft;

(b) symmetrically reciprocally varying the spark timing and air/fuel ratio about their respective given settings in timed synchronization with the angular rotation of said output shaft;

(c) determining the average speed of rotation of said output shaft in plural segments of said dither cycle of the spark timing and air/fuel ratio settings;

(d) computing from the average speed values in said plural segments a spark timing error and an air/fuel ratio error; and (e) adjusting the given spark timing setting and given air/fuel ratio setting by an amount proportional to said spark timing error and air/fuel ratio error, respectively.

13. A method for minimizing the fuel consumption of an internal combustion engine of the type having an output shaft coupled to a load to be driven, an ignition system with means for varying spark timing about a given spark timing setting during a dither cycle and means for varying the EGR flow of the air/fuel mixture delivered to the engine about a given EGR flow setting during said dither cycle comprising the steps of:

(a) sensing integral rotations of said output shaft;

(b) symmetrically reciprocally varying the spark timing and EGR flow about their respective given settings in timed synchronization with the angular rotation of said output shaft;

(c) determining the average speed of rotation of said output shaft in plural segments of said dither cycle of the spark timing and EGR flow settings;

(d) computing from the average speed values in said plural segments a spark timing error and an EGR flow error; and (e) adjusting the given spark timing setting and given EGR flow setting by an amount proportional to said spark timing error and EGR flow error, respectively.

14. An adaptive electronic control system for optimizing fuel consumption of an internal combustion engine, said engine being of the type having an output shaft coupled to a load to be driven, an adjustable spark timing module and means for adjusting the air/fuel ratio or EGR flow delivered to the cylinders of said engine, said control system comprising:

(a) microcontroller means having a first memory means for storing a program of instructions at addressable locations therein and second memory means for storing operands including time per revolution values corresponding to the speed of said output shaft;

(b) means including said microcontroller means coupled to said adjustable spark timing module and to said air/fuel ratio or said EGR flow adjusting means for introducing cyclic bidirectional incremental changes in both the spark timing and the air/fuel ratio or EGR flow of said engine in synchronism with integral rotations of said output shaft;

(c) shaft rotation sensing means coupled to said output shaft and to said microcontroller means for defining integral rotations of said output shaft, said microcontroller means programmed to compute and store in said second memory means the time required for each integral revolution of said output shaft during predetermined phases of the cyclic incremental changes in spark timing and air/fuel ratio or EGR flow;

(d) said microcontroller means being further programmed to compute first and second error signals based upon the stored time values; and (e) means for periodically modifying the spark timing setting and air/fuel ratio or EGR flow setting in accordance with said first and second error signals, respectively.

* * * * *